United States Patent [19]
Gerdes

[11] 4,013,191
[45] Mar. 22, 1977

[54] LOCKABLE CLOSURE CAP

[75] Inventor: Theodor Gerdes, Langenfeld, Germany

[73] Assignee: Blau KG Fabrik fur Kraftfahrzeugteile, Langenfeld, Germany

[22] Filed: Sept. 16, 1975

[21] Appl. No.: 613,830

[30] Foreign Application Priority Data

Sept. 18, 1974 Germany .......................... 2444477

[52] U.S. Cl. ............................. 220/203; 70/172; 220/210; 220/303; 220/304
[51] Int. Cl.² .................. B65D 51/16; B65D 55/14
[58] Field of Search ....................... 70/167–173; 220/210, 295, 302, 303, 203, 304

[56] References Cited
UNITED STATES PATENTS

| | | | |
|---|---|---|---|
| 1,806,218 | 5/1931 | Reid | 220/302 |
| 2,125,819 | 8/1938 | Schneider | 70/172 |
| 2,255,070 | 9/1941 | Malluk | 70/172 |
| 2,995,148 | 8/1961 | Novak et al. | 137/493.6 |
| 3,820,680 | 6/1974 | Friend | 220/303 |

Primary Examiner—William Price
Assistant Examiner—Allan N. Shoap
Attorney, Agent, or Firm—Michael J. Striker

[57] ABSTRACT

A lockable closure cap has a displaceable catch projection. A centrally located lock cylinder is supported in a cylindrical socket located within the cap. The cylindrical socket has an eccentric collar on which a locking ring carrying the catch projection is supported, and the cylindrical socket is rotatable with the lock cylinder to displace the locking ring via its eccentric collar. A sealing ring is supported on the upper edge of the outer socket for providing a liquid-tight seal while allowing automatic pressure compensation.

11 Claims, 2 Drawing Figures

LOCKABLE CLOSURE CAP

The application relates to a lockable closure cap to be actuated, especially by a key, whereby via an eccentric collar rotated by the locking cylinder a lock catch can be actuated and moved into its locked or unlocked position in a direction normal to the cylinder axis.

Of such closure caps it is generally demanded that lock parts inserted therein and actuated from the outside be mounted sealed in such a manner that the contents of the closed container or a pipe socket is unable to spill out via the mounted lock part. Also, it should be ensured that the sealing of the lock parts in the cap are so formed that their sealings effect may be maintained.

It is known to use sealing rings located within the closure cap pressing against the lock cylinder, for both screw-type closure caps and bayonet catch caps. It is also known to provide sealing collars acting against a central socket below the outer cover cap which, however, cannot prevent liquid from spilling out along the lock cylinders mounted in the interior of such hollow sockets. Finally, it is also customary to seal closing cylinders inserted in caps at the end, say such as by means of sealing rings, or by sealing caps enclosing the locking cylinders completely at the base.

It is an object of the invention to provide a cylinder lock mounted centrally in a closure cap so as to be sealingly enclosed.

According to the present invention there is provided a closure cap secured by a cylinder lock wherein the lower end of the lock cylinder is connected to the base of a cup-shaped hollow cylindrical part partially enclosing the lock cylinder, the outer walls of the hollow cylindrical part having an eccentric collar on which there is supported a locking ring having a catch projection which can be displaced radially, dependent upon the movement of a key in the lock, into a locked or unlocked position, and the upper edge of the hollow cylindrical part abuts a sealing ring under the action of a compression spring supported in the cap housing.

The present invention will be described further, by way of example, with reference to the accompanying drawings, in which.

Figure 1:
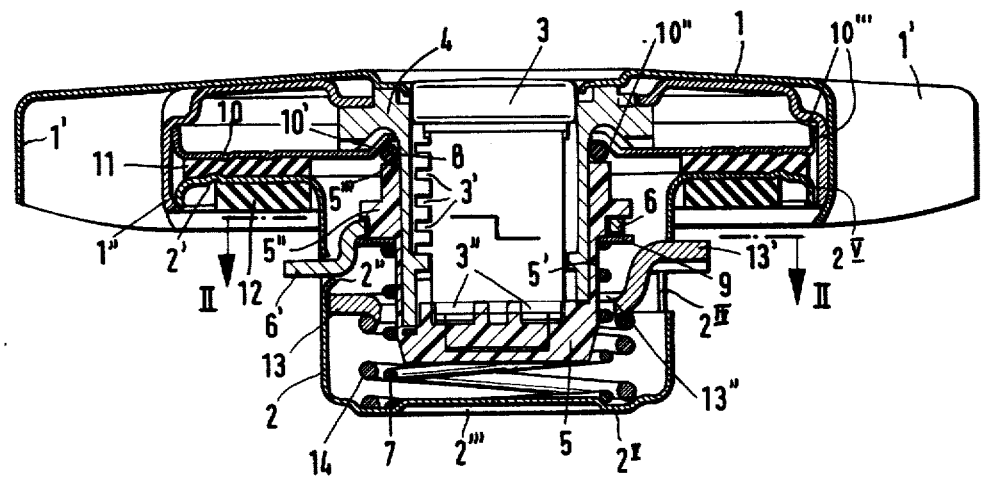
FIG. 1 shows a closure cap in cross-section along the line I—I of FIG. 2.
Figure 2:
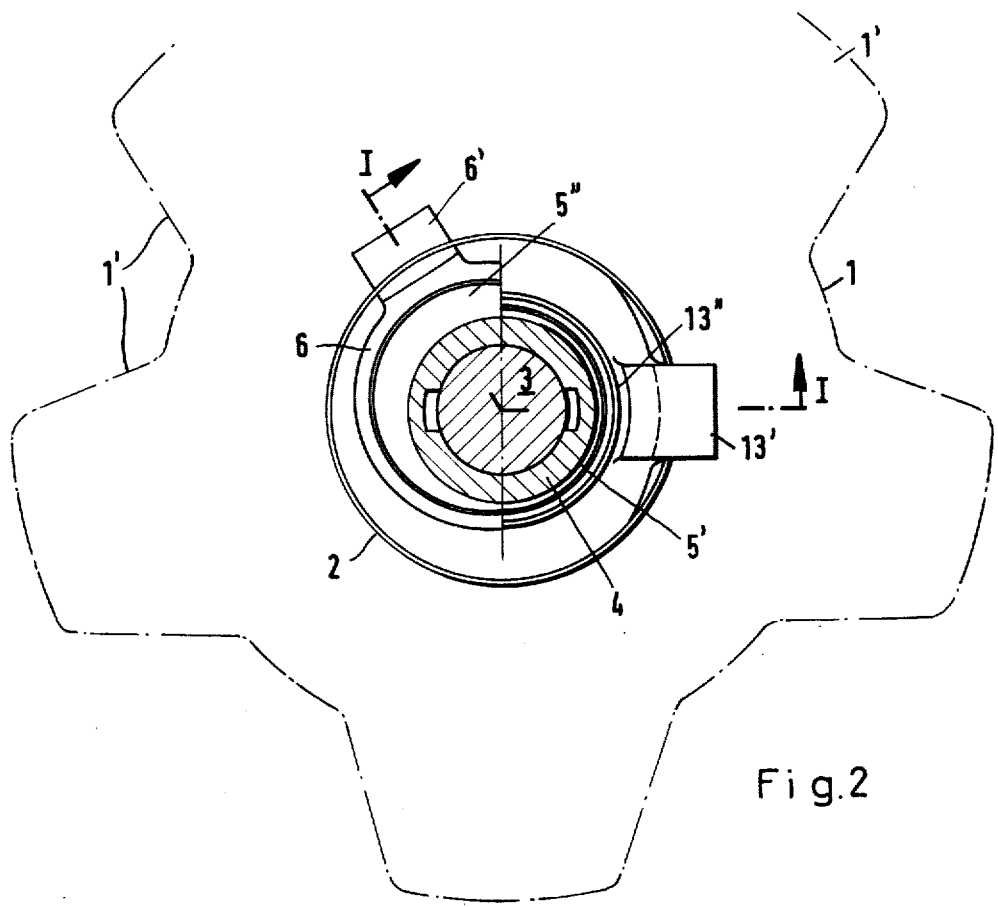
FIG. 2 is a sectional view along the line II—II of FIG. 1.

In the Figures, an outer cap part 1 is shown as having projections 1' spaced around the circumference and acting as hand-grips (as additionally indicated in FIG. 2 in plan view). An inner, spring housing part 2 is located within the outer cap part 1 to form a cap unit therewith. A cylinder lock 3 with lateral tumblers 3' is inserted within a hollow cylindrical central socket 4 mounted in the cap unit and the lower end of the lock cylinder 3 engages a base 5 of a cup-shaped hollow cylindrical element 5' and may be positively coupled therewith by means of cam extensions 3" received in corresponding recesses in the base 5. This cup-shaped cylinder 5' extends upwardly and around the central socket 4 and is so mounted as to be rotatably displaceable within the cap unit. The cylinder 5' has an eccentric collar 5" supporting a ring 6 having an angled locking catch 6' projecting from one side. Upon movement of a key in the lock, the cylinder 3 rotates and the lower cam extentions 3" thereof rotate the cup-shaped cylinder 5' via their base engagement. The locking catch ring 6 located on the eccentric collar 5" is actuated by the rotation of the cylinder 5' to slide the locking catch 6' radially outwards through an aperture 2" into its locking position. The aperture 2" is bent inwardly of the part 2 in order to provide the catch 6', upon an opposite movement of the key in the lock and corresponding withdrawal of the catch 6' into its open position, with an abutment on the cap wall at 2". A sealing ring 8 is supported on an upper edge 5'" of cylinder 5', which sealing ring 8 is compressed by a spring 7 supported between the collar 5" and a base 2'" of the housing. Below the collar 5", a flat ring 9 is provided, whereby a better abutment bearing between the compression spring 7 and the flange wall 5" is ensured, and then catch ring 6 is securely supported on collar 5". The sealing ring 8, biased by the spring 7, presses from below against an inclined inner edge 10' of an intermediate annular plate 10 and laterally against the socket 4 with constant pressure. Between the intermediate plate 10 and a radially outwardly extending section 2' of the lower cap housing, a flat sealing ring 11 is inserted. A conventional sealing ring 12 is provided on the underside of section 2' for abutment against the container or socket nut, not shown.

A plate-shaped member 13 having a large central hole 13" is formed as a bayonet catch bridge having two bayonet catches 13' angled upwards (only one of which is shown), which extend through apertures 2"' diametrically opposite one another in the housing wall 2. Upon tightening the cap 1, the catches 13 engage with the neck of a container or socket, not shown, and a further compression spring 14 supported between the bayonet bridge plate 13 and the cap base 2'" resiliently biases the plate 13.

The compression springs 7 and 14, supporting the cylinder 5' and the bayonet bridge plate 13, respectively, are mutually coaxially supported with a small spacing between them in an annular depression 2" pressed out of the base 2'" of the cap.

The cylinder 5' with eccentric collar 5" for controlling the locking catches 6' of the ring 6 can be made of synthetic plastic material.

A modified embodiment for the closure cap with automatic pressure compensation can be obtained by providing at least one shallow radial groove 10 in the edge 10' of the plate 10, such that a passage is provided between the sealing ring 8 and the edge 10' through which only gases or vapours can pass, thus providing corresponding pressure compensation whilst preventing liquid from escaping. In this case the outer edges of the intermediate plate 10 and an edge of the section 2' may be provided with grooves 10'" and 2"; for providing external communication around the cap edge 1".

What is claimed is:

1. A lockable closure cap for containers and the like, comprising a cap unit; a cylinder lock mounted on said cap unit for rotation relative thereto about an axis between a locking and an unlocking position; a hollow cylindrical element surrounding and connected to said cylinder lock for shared rotation therewith and having an eccentric outer collar; a locking ring having a catch projection which extends radially thereof, supported on said eccentric outer collar, and retained in said cap unit against rotation about said axis but with freedom of movement substantially radially of said axis in response to the rotation of said eccentric outer collar so that said catch projection moves between an extended and a retracted position as said cylinder lock rotates between said locking and unlocking position; and sealing means interposed between said cylindrical element and said cap unit and operative for preventing the contents of the container from penetrating into and escaping through said cylinder lock.

2. A closure cap as defined in claim 1, wherein said cylindrical element is substantially cup-shaped and has a bottom wall formed with at least one recess; wherein said cylinder lock has at least one projection received in said recess and operative for entraining said cylindrical element for said shared rotation and for permitting axial displacement of said cylindrical element relative to said cylinder lock; and further comprising biasing means urging said cylindrical element axially toward said cylinder lock and into sealing contact with said sealing means.

3. A closure cap as defined in claim 2, wherein said cap unit includes an outer part, a tubular socket rigidly connected to said outer part and coaxially extending between said cylinder lock and said cylindrical element and adapted to cooperate with tumblers of said cylinder lock, and an inner part connected to said outer part and surrounding said cylindrical element and having an aperture through which said catch projection extends at least in said extended position thereof; and wherein said biasing means includes at least one spring which abuts against said inner part of said cap unit and said cylindrical element to urge the latter axially away from the former.

4. A closure cap as defined in claim 3, wherein said inner part has a base wall; further comprising a flat ring adjacent to said collar at a side thereof facing said base wall and surrounding said cylindrical element; and wherein said spring abuts against said base wall and said flat ring, respectively.

5. A closure cap as defined in claim 14, wherein said cap unit further includes an intermediate annular plate affixed to said outer part of said cap unit and having a central opening through which said tubular socket extends; and wherein said sealing means includes a sealing ring received between a free end face of said cylindrical element, said intermediate annular plate, and an outer circumferential surface of said tubular socket and pressed against the same by said spring.

6. A closure cap as defined in claim 5, wherein said intermediate annular plate has an arcuately inclined edge portion around said central opening, said sealing ring being pressed into fluid-tight contact with said edge portion.

7. A closure cap as defined in claim 6, and further comprising means for compensating the pressure in the container, including at least one groove in said edge portion of said intermediate annular plate and which has such dimensions that only gaseous media can flow therethrough past said sealing ring while the liquid contents of the container is prevented from flowing therethrough.

8. A closure cap as defined in claim 5; and further comprising a flat annular sealing ring interposed between and in sealing contact with said intermediate annular plate and a radially outwardly extending portion of said inner part of said cap unit.

9. A closure cap as defined in claim 1, wherein said inner part has a base wall and a circumferential wall having additional apertures; further comprising a bayonet catch bridge having a central portion having an opening through which said socket and said spring extend, and radially outwardly extending catch portions angled relative to said central portion and extending through said additional apertures; and further comprising an additional spring coaxial with said spring and extending between said base wall and said bayonet catch bridge and urging the latter axially away from the former.

10. A closure cap as defined in claim 9, wherein said base wall has at least one annular depression in which an end portion of at least one of said springs is received.

11. A closure cap as defined in claim 1, wherein said cylindrical element is of a synthetic plastic material.

* * * * *